Nov. 14, 1961 A. C. SENGER 3,008,746
PIVOTALLY MOUNTED HYDRAULIC BUMPER ASSEMBLY FOR VEHICLES
Filed May 27, 1959
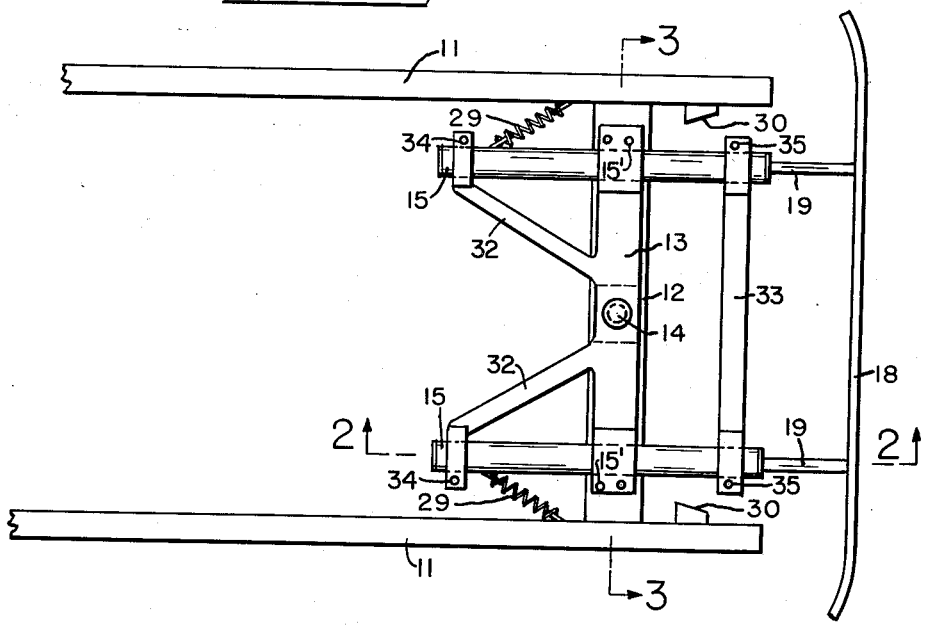
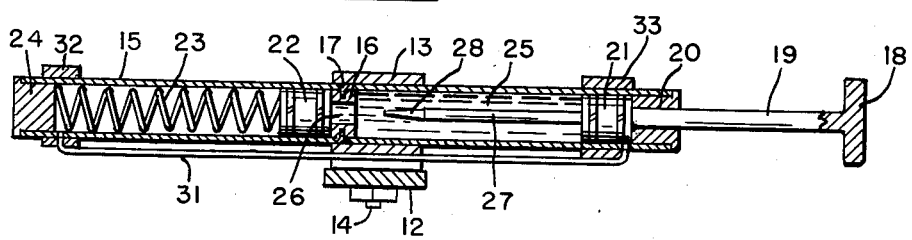
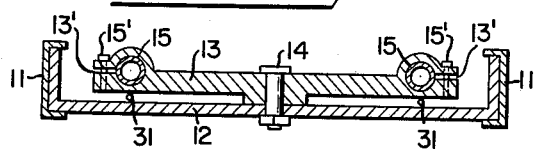
INVENTOR.
ALBERT C. SENGER.
BY
ATTORNEY.

United States Patent Office 3,008,746
Patented Nov. 14, 1961

3,008,746
PIVOTALLY MOUNTED HYDRAULIC BUMPER
ASSEMBLY FOR VEHICLES
Albert C. Senger, 1816 Morey Ave., Hamilton, Ohio
Filed May 27, 1959, Ser. No. 816,244
2 Claims. (Cl. 293—70)

This invention relates to an improvement in hydraulic bumpers for vehicles wherein hydraulic cylinders are used to absorb the shock of impact against a foreign object and includes means for returning the bumper to normal position.

Much damage to the body of an automobile or other vehicle as well as the occupants can be averted by the use of my yielding bumpers. The sudden impact of a moving body against another body creates the major damage incident to a collision. However, when such collisions do occur my improved bumpers absorb the shock of the impact and ease the bodies preventing extensive damage.

The object of my invention is to provide a vehicle with bumpers yieldable under pressure, and the yielding being controlled by the bleeding of hydraulic cylinders.

A further object is to provide means for controlling the bleeding of the hydraulic cylinders.

A further object is to provide pivotal movement to the cylinders to align the cylinders with the point of impact.

A further object is to provide means for returning the bumpers to normal positions after an impact with another object.

My invention will be further readily understood from the following description and claims, and from the drawings, in which latter:

FIG. 1 is a plan view of a portion of an automobile frame with my improvement mounted thereon.

FIG. 2 is a sectional view of one of the cylinders, taken in the plane of the line 2—2 of FIG. 1.

FIG. 3 is a section view, taken in the plane of the line 3—3 of FIG. 1.

My improved bumper unit is arranged to be attached to the frame of a vehicle, being supported by a pivot to a cross-member of the frame. While I have shown one such bumper it is apparent that a similar bumper may extend from either or both ends of the vehicle.

The automobile frame is indicated at 11 having a cross-member 12. This cross-member 12 is suitably secured to the longitudinal frame members 11 by any suitable means common in the construction of automobile frames. A member 13 is pivotally supported on the cross-member 12 by a suitable pivot 14. The member 13 supports cylinders 15 clamped in the member. The member 13 has enlarged ends with a split 13' in the ends, and the cylinders 15 are clamped in the enlarged ends by means of bolts 15'. The diagonal arms 32 have split ends and a member 33 has split ends for further supporting the cylinders 15 in alignment and the split ends clamp the cylinders in place by means of respective bolts 34 and 35.

The two cylinders 15 are similar and each cylinder is divided into two sections with a divider 16 secured therein by screws 17. A bumper 18 has extensions 19 guided in bearings 20. Each extension 19 is connected to a piston 21 in one section of each cylinder. A second piston 22 is normally maintained adjacent to the divider on the other side of the divider by means of a spring 23 interposed between the piston and the rear wall 24 of each cylinder. The area in each cylinder between the two pistons is filled with hydraulic fluid 25. The divider 16 has an aperture 26 to permit the fluid to pass from one section to the other. The piston 21 has an extension rod 27 terminating in a tapered end 28 in alignment with the aperture 26.

Springs 29 interposed between the cylinders and the frame normally maintain the bumper and cylinders in alignment with the frame. Stops 30 are provided to limit the pivotal movement of the cylinders.

When the incident of impact is angular the entire cylinder unit will pivot before the bumper rods and pistons move forward. The apertures in the dividers permit the pistons to move rapidly upon the first impact and as the rods 27 enter the apertures 26 the flow is gradually decreased to ease the impact. When the cause of the bumper movement is removed, the springs 23 return the pistons to normal position and the springs 29 will center the device. An air line 31 connects the respective ends of the cylinders to prevent compression of the air in the respective sections.

In a device of this nature it is imperative that upon the first impact rapid movement of the bumper take place so that the bumper will ride with the shock, however, with my improved rod extensions on the pistons the aperture through which the fluid is forced is decreased in size as the piston moves forward to gradually impose a greater resistance to the movement of the bumper after the first impact.

Having thus fully described my invention what I claim as new and desire to secure by Letters Patent is:

1. A vehicle hydraulic bumper combination comprising a vehicle, a bumper, cylinders mounted on a member, said member pivoted on said vehicle, extensions from said bumper extending through bearings in said cylinders, pistons on said extensions, dividers in said cylinders, hydraulic fluid between said pistons and said dividers, second pistons in said cylinders on the other side of said dividers, apertures in said dividers, tapered extensions on said first named pistons for entering said apertures to gradually increase the resistance to movement of said first named pistons, springs for returning said pistons to normal position, and springs for normally maintaining said pivoted member in alignment with said frame.

2. A vehicle hydraulic bumper combination comprising a vehicle, said vehicle having a frame, a bumper, extensions extending from said bumper, a member pivoted to said frame, cylinders mounted on said member, said extensions from said bumper connected to pistons in said cylinders, apertures in dividers in said cylinders, rods extending from said pistons having tapered ends in alignment with said apertures, pistons in said cylinders on the other side of said dividers, springs in said cylinders for normally maintaining said second named pistons adjacent to said dividers, hydraulic fluid in said cylinders between said pistons, and springs for normally maintaining said pivoted member in alignment with said frame.

References Cited in the file of this patent

UNITED STATES PATENTS

| | | |
|---|---|---|
| 1,071,586 | Rowan | Aug. 26, 1913 |
| 1,325,342 | Watson et al. | Dec. 16, 1919 |
| 1,655,976 | Schmidt | Jan. 10, 1928 |
| 1,759,939 | Elsey | May 27, 1930 |
| 1,807,132 | Pappas et al. | May 26, 1931 |
| 1,843,902 | Ridge | Feb. 2, 1932 |
| 1,855,977 | Llobet | Apr. 26, 1932 |
| 1,925,461 | Ridge | Sept. 5, 1933 |
| 2,404,931 | Somervell | July 30, 1946 |
| 2,737,301 | Thornhill | Mar. 6, 1956 |

FOREIGN PATENTS

| | | |
|---|---|---|
| 53,493 | Denmark | Aug. 23, 1937 |